United States Patent [19]

Salters

[11] Patent Number: 4,907,835

[45] Date of Patent: Mar. 13, 1990

[54] PORTABLE ARM REST APPARATUS

[76] Inventor: Charles Salters, 5454 Robin Cr., Adamsville, Ala. 35005

[21] Appl. No.: 229,347

[22] Filed: Aug. 8, 1988

[51] Int. Cl.$^4$ .............................................. B60J 9/00
[52] U.S. Cl. ...................................... 296/1.1; 296/153; 297/411; 248/118
[58] Field of Search ................. 296/1.1, 153; 248/118, 248/297.5, 246, 535, 534; 297/412, 394, 411, 422; 362/431; 108/148; 403/261, 256, 373, 409.1

[56] References Cited

U.S. PATENT DOCUMENTS

| 2,693,332 | 11/1954 | Albert | 248/534 X |
| 2,793,286 | 5/1957 | Stiffel | 362/431 |
| 2,965,751 | 12/1960 | Stiffel | 362/431 |
| 2,979,605 | 4/1961 | Meyerowitz | 362/431 X |
| 3,072,784 | 1/1963 | Mann | 362/431 X |
| 3,310,339 | 3/1967 | Stanley | 296/153 |
| 3,985,924 | 10/1976 | Pritza | 362/431 X |

FOREIGN PATENT DOCUMENTS 71675  5/1916  Austria ................................. 248/118

Primary Examiner—Dennis H. Pedder
Assistant Examiner—Andrew C. Pike
Attorney, Agent, or Firm—Jennings, Carter, Thompson & Veal

[57] ABSTRACT

A removable arm rest apparatus for use in a truck cab utilizes an upright tubing structure and a flat arm support member projecting normally outward therefrom. Compressive mounting means enclosed within the uppermost end of the tubing structure position the tubing structure firmly between the cab roof and cab floor. A washer encircling the tubing structure positions the arm support member at the desired location. Movement of the washer along the longitudinal axis of the tubing structure adjusts the height of the arm support member relative to the cab floor. The apparatus may be easily removed and disassembled for storage and subsequent use in another truck cab.

17 Claims, 1 Drawing Sheet

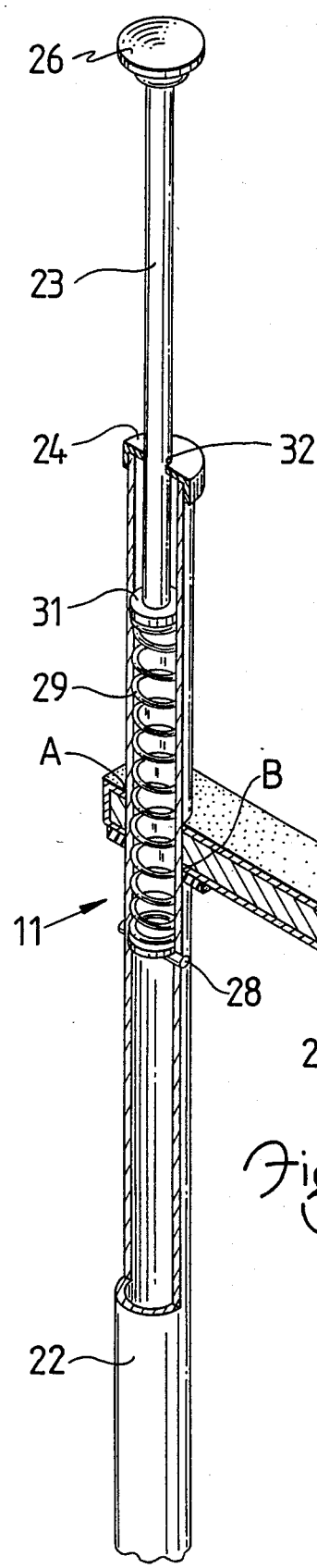
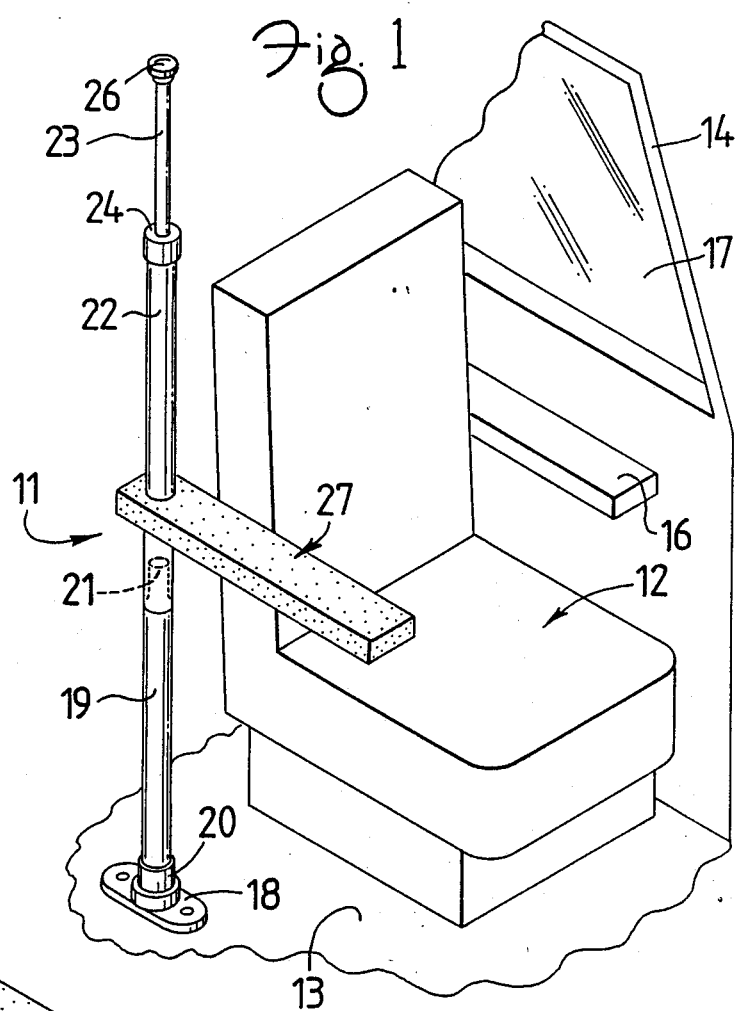
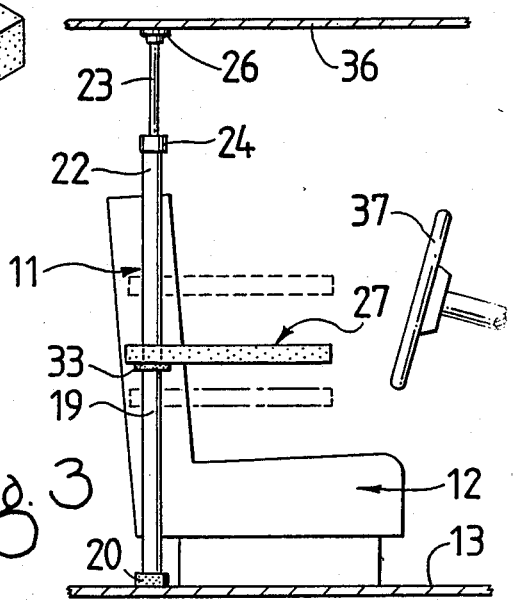
Fig. 1
Fig. 2
Fig. 3

PORTABLE ARM REST APPARATUS

FIELD OF THE INVENTION

The present invention relates to the field of motor vehicle equipment and more particularly to an accessory for use in the driver's compartment thereof. Even more particularly, the present invention may be utilized in a truck cab for enhancement of driver comfort.

BACKGROUND OF THE INVENTION

Early motor vehicle manufacturers offered only a limited choice of luxury interior options and concentrated primarily on refinement of mechanical and electrical operating hardware. However, as vehicle hardware entered an era of standardization, attention to improvement of driver comfort increased dramatically. While most passenger vehicles now offer numerous luxury interior options, trucks and other commercial vehicles are outfitted with very spartan interior accessories. Although a limited number of luxury trucks ply the highways, most truck drivers operate fleet vehicles on a daily basis. Fleet trucks are generally purchased in quantity by trucking concerns with an eye toward efficiency and low cost, so luxury cab accessories are deemed prohibitively expensive.

The typical fleet vehicle utilizes only a single driver's seat on the left side of the cab, or at most a pair of bucket seats mounted on opposite sides of the cab. A padded platform projecting normally outward from the door panel provides a resting place for the operator's left arm (or passenger's right arm). No such arm rest is provided for the operator's right arm (passenger's left arm), which must remain uncomfortably suspended next to the body for extended periods. During a full work day this position exacts a considerable toll on a driver's performance.

SUMMARY OF THE INVENTION

It is an object of the present invention to provide an arm rest apparatus for use in the interior compartment of a commercial vehicle. It is another object of the present invention to provide an arm rest apparatus that may be quickly installed in or removed from the cab of a commercial vehicle. It is yet another object of the present invention to provide an arm rest apparatus that may be readily transportable from vehicle to vehicle and easily stored when not in use. It is still another object of the present invention to provide an accessory to enhance driver performance and to increase highway safety.

To accomplish these objects I have mounted a conventional arm rest on a spring loaded telescoping pole. Compressively mounting the telescoping pole between the roof and floor of the cab provides a secure mount for the arm rest, which may be positioned at any point along the longitudinal axis of the pole. A comfortable arm rest position is thereby assured for any size driver or any seat configuration.

The telescoping pole comprises two sections of tubing which may be disengaged from one another for easy storage. An upper tube section contains the mounting components, a spring and an extension rod. The spring urges the extension rod upward out of the top of the upper tube into engagement with the cab roof. A rubber suction pad on the uppermost end of the extension rod prevents slippage. A lower tube section extends downward from its point of attachment with the upper tube section and engages the cab floor. A rubber foot prevents dislodgment of the lower tube from the floor surface. A measure of enhanced stability may be achieved by mounting a bracket on the cab floor to secure the telescoping pole apparatus.

A rubber washer tightly encircles the periphery of the telescoping pole and may be moved to any location thereon. Subsequent to washer mounting the arm rest may be installed over the telescoping pole and moved to a position resting atop the washer. The arm rest projects radially outward from the telescoping pole and may be turned to any position around the longitudinal axis thereof. Merely repositioning the washer adjusts the vertical height of the arm rest.

When the operator's arm is not resting on the upper surface of the arm rest, friction between the tight fitting washer and the telescoping pole holds the arm rest in position. If an arm is placed on the arm rest, the applied downward force thereon acts to wedge the arm rest member against the telescoping pole, thereby preventing gradual washer slippage.

The above described apparatus is a portable arm rest which may be placed in any vehicle with an accessible roof area and an accessible flat floor or console. Installation of the device converts a common truck seat into an ergonomically designed dual arm rest seat commonly known as a "captain's chair".

The simple, low cost device may be easily installed upon entering a truck and easily removed upon destination. The collapsible design stores conveniently under or behind a seat until needed. All drivers know that dual arm rests greatly increase comfort and reduce fatigue during extended travel. With my invention even fleet truck drivers who are not owner-operators have access to the comfort and convenience provided by dual arm rests. Installation of my invention increases driver productivity by reducing fatigue and distractions, and thereby promotes highway safety.

BRIEF DESCRIPTION OF THE DRAWINGS

FIG. 1 is a perspective view of my invention mounted alongside the driver's seat of a motor vehicle.

FIG. 2 is a perspective view of my invention taken partially in section.

FIG. 3 is a side elevational view of my invention mounted alongside the driver's seat of a motor vehicle.

DESCRIPTION OF A PREFERRED EMBODIMENT

Referring to FIG. 1, my invention denoted at 11 is a removable arm rest apparatus for use in a motor vehicle driver's compartment or truck cab. A driver's seat 12 is shown mounted on a cab floor 13. A driver's side door 14 includes an arm rest 16 for supporting the driver's left arm and a window 17 which allows the driver to view outwardly to the roadway.

A mounting bracket 18 securely anchors a lower tube 19 to the cab floor 13. A rubber end cap 20 encloses the lowermost end of the lower tube 19 and ensures tight, rattle free mounting in the mounting bracket 18. A tapered end 21 of the lower tube 19 inserts into an upper tube 22, which may be detached from the lower tube 19 to facilitate disassembly of the apparatus 11. An extension rod 23 protrudes from the uppermost end of the upper tube 22 and engages slidably with a dust cap 24, which seals the upper tube 22. An aperture 32 in the dust cap 24 guides the extension rod 23. A concave rubber suction tip 26 ensures non-slip contact between the extension rod 23 and the cab roof (see FIG. 3).

An aperture near an end of an arm rest 27 allows insertion of the extension rod 23 and the upper tube 22. The arm rest 27 then may be moved longitudinally down the tube structure until finally coming to rest atop a rubber washer. The rubber washer holds the arm rest in position as will be explained more fully below. The flat upper surface of the arm rest 27 provides a resting place for the driver's right arm.

FIG. 2 shows the compressively mounting means fully contained within the upper tube 22, which urges the extension rod 23 upward into contact with the cab roof. A pin 28 inserted diametrically into the upper tube 22 supports a spring 29, which acts on a rubber disc 31 attached to the extension rod 23, thereby urging the extension rod 23 upwardly. Note that the extension rod 23 travels in a guide aperture 32 in the dust cap 24.

As noted above, a rubber washer 33 tightly encircles the upper tube 22. The washer 33 may be slidably moved to any position on the upper tube 22 or the lower tube 19. The arm rest 27, comprised of a base 34 and a padded covering 35, rests atop the washer 33. When the arm rest 27 is not in use, friction between the washer 33 and the upper tube 22 is sufficient to hold the arm rest in position. When downward force is exerted on the arm rest 27, the short end of the arm rest 27 presses against the upper tube 22 at position A and the long end thereof presses downward at position B on the washer 33. The arm rest is thereby held firmly in place. This very simple retention system allows the driver to move the arm rest 27 up and down by moving the washer 33 while simultaneously maintaining a full range of rotary arm rest motion about the longitudinal axis of the tubing structure.

FIG. 3 depicts the apparatus 11 mounted between the cab floor 13 and the cab roof 36. As shown in FIG. 2, the spring 29 urges the extension rod 23 upward against the roof 36. The rubber tip 26 ensures non-slip contact with the roof 36. The rubber end cap 20 may rest directly on the floor 13. Use of the bracket 18 (FIG. 1) is recommended to ensure positive mounting. However, if the vehicle floor is inaccessible, affixing a bracket thereto may not always be feasible. In such instances, the apparatus may be mounted between the roof and a center console.

Note also the range of adjustability possible with the arm rest 27. A driver may move the washer 33 upward or downward to position the arm rest for convenient accessibility to a steering wheel 37.

In operation, the lower tube 19, the upper tube 22 (with associated biasing means), and the arm rest 27 initially are assumed stored in disengaged form. When occasion to use the apparatus arises, the tapered end 21 of the lower tube 19 inserts in the upper tube 22. The washer 33 may be positioned at any point on the tube structure. Next the arm rest slips over the uppermost end of the upper tube 22 (and over the extension rod protruding therefrom), slides down the tube structure and comes to rest on the washer 33. To install the apparatus, the extension rod 23 is deflected downward, compressing the spring 29. The tubing structure is positioned in the vehicle's interior compartment by inserting the lower end cap 20 into the floor mounted bracket 18 and releasing the extension rod 23 until the rubber suction tip 26 engages the roof. With the apparatus now in position, the arm rest 27 may be finely adjusted by repositioning the washer 33. The arm rest 27 may subsequently be rotated about its mount to a comfortable position.

While I have shown my invention in one form, it will be obvious to those skilled in the art that it is not so limited but is susceptible of various changes and modifications without departing from the spirit thereof.

What I claim is:

1. A removable arm support apparatus for use in a truck cab having a roof and an accessible floor, said apparatus comprising:
    (a) an upright tubular member;
    (b) means for resiliently mounting said tubular member between the roof and the floor of the cab;
    (c) means for achoring said tubular member on the floor of said cab;
    (d) a rubber washer encircling an outside surface of said tubular member, said washer being selectively positionable along a longitudinal axis thereof;
    (e) a flat arm rest member having an aperture proximal one end thereof for insertion of said tubular member, said arm rest member resting atop said washer and projecting normally outwardly from said tubular member.

2. An apparatus as defined in claim 1 wherein said means for resiliently mounting comprises:
    (a) a support pin extending diametrically across said tubular member near an upper end thereof;
    (b) a telescoping rod projecting outwardly from the upper end of said tubular member;
    (c) a spring with a lower end abutting against said support pin and an upper end urging said telescoping rod upward into engagement with said roof.

3. An apparatus as defined in claim 2 wherein a rubber dust cap encloses the upper end of said tubular member, said dust cap having a small central aperture to allow extension of said telescoping rod member therethrough.

4. An apparatus as defined in claim 3 wherein said telescoping rod is slidably engaged within said small central aperture.

5. An apparatus as defined in claim 2 wherein a flat rubber stop on a lowermost end of said telescoping rod rests on said spring and a rubber cup-like member on an uppermost end of said telescoping rod engages said roof.

6. An apparatus as defined in claim 2 wherein said tubular member comprises a lower tube section which may be selectively disengaged from an upper tube section, said disengagement permitting more convenient removal of the apparatus from said cab.

7. An apparatus as defined in claim 1 wherein a rubber end stop encloses a lower end of said tubular member and rests on said floor.

8. An apparatus as defined in claim 7 wherein said means for anchoring comprises a mounting bracket affixed to the floor of said cab, the lower end of said tubular member being inserted therein.

9. An apparatus as defined in claim 1 wherein said arm rest member comprises:
    (a) an elongated plate-like member;
    (b) a padded covering for said said plate-like member, said covering providing a resting place for a driver's arm.

10. An apparatus as defined in claim 9 wherein said aperture is sufficiently limited in diameter such that said arm rest member rests atop said washer, a downward pressure of the driver's arm distal said aperture urging said arm rest member against said tubular member to prevent slippage therebetween.

11. An apparatus for supporting a driver's right arm during operation of a motor vehicle, said apparatus comprising:
   (a) a vertically disposed tubular member placed in a cab of said vehicle;
   (b) means for resiliently mounting said tubular member between a floor and a roof of said cab;
   (c) a horizontally disposed elongated platform providing a resting place for said driver's arm, said platform having an aperture proximal one end thereof for insertion of said tubular member;
   (d) a rubber washer slidably engaging said tubular member beneath said elongated platform.

12. An apparatus as defined in claim 11 wherein said tubular member is comprised of a tapered lower tube inserted within an upper tube, said lower tube being disengagable from said upper tube to facilitate removal of the apparatus from said cab.

13. An apparatus as defined in claim 12 wherein said means for resiliently mounting comprises:
   (a) a pin inserted in a lower end of said upper tube perpendicular to a longitudinal axis thereof;
   (b) a dust cover sealing an upper end of said upper tube, said cover having a central aperture therein;
   (c) a telescoping tube slidably engaged in said central aperture and extending outwardly therefrom into contact with said roof;
   (d) a spring inserted in said upper tube and having a lower end resting on said pin and an upper end exerting upward force on said telescoping tube.

14. An apparatus as defined in claim 13 wherein a flat rubber disc on a bottom end of said telescoping tube contacts the upper end of said spring and a concave rubber disc on a top end of said telescoping tube contacts said roof.

15. An apparatus as defined in claim 12 wherein said means for resiliently mounting further comprises a receptacle mounted on said floor, said lower tube being retained therein.

16. An apparatus as defined in claim 12 wherein said means for resiliently mounting further comprises a rubber foot on said lower tube, said foot resting on said floor and securing said lower tube thereto.

17. An apparatus as defined in claim 11 wherein an end of said platform opposite said aperture is padded to provide a comfortable resting place for the arm of said driver, a downward force exerted by said arm thereby mounting said platform between said washer and said tubular member.

* * * * *